Jan. 16, 1962     H. T. KRAFT     3,017,312
APPARATUS FOR SUPPLYING PLY FABRIC TO A TIRE BUILDING DRUM
Filed April 12, 1957     6 Sheets-Sheet 1

Fig. 1

INVENTOR
*Herman T. Kraft*
BY *McCoy, Greene & TeGrotenhuis*
ATTORNEYS

INVENTOR
Herman T. Kraft
BY McCoy, Greene + Te Grotenhuis
ATTORNEYS

United States Patent Office 3,017,312
Patented Jan. 16, 1962

3,017,312
APPARATUS FOR SUPPLYING PLY FABRIC TO A TIRE BUILDING DRUM
Herman T. Kraft, Akron, Ohio, assignor to The General Tire & Rubber Company, Akron, Ohio, a corporation of Ohio
Filed Apr. 12, 1957, Ser. No. 652,600
10 Claims. (Cl. 156—361)

The present invention relates to tire building machines and more particularly to servicers for supplying ply fabric, tread rubber and the like to tire building drums.

Heretofore it has been proposed to provide a servicer for supplying fabric of several different widths to a tire building drum. Servicers of this type required a separate reel for each width of fabric and were, therefore, unduly large, complicated, very expensive to build, and inconvenient to operate.

According to the present invention, servicing means are provided for supplying material to a tire building drum which may be built at a small fraction of the cost of previously known machines and which enable the building of the highest quality tires efficiently at a minimum cost. The means for supplying the material comprises a pair of servicers located on opposite sides of the tire building drum and having fabric guiding tables extending over the drum.

The main fabric servicer has only one supply roll which contains enough rubberized fabric to build anywhere from 20 to 40 tires. Since from four to six plies of each tire carcass can be formed from the fabric removed from this roll, very little time is required to change rolls on the machine. The end edges of the fabric plies applied to the tire building machine are staggered without employing fabric of different widths by providing a laterally movable carriage and pawl-and-ratchet means, or other suitable means for controlling the carriage and the position of the fabric to be supplied from said carriage to the tire building drum. Novel means are provided for adjusting the position of the servicer, for guiding the fabric to the carriage, and for permitting swinging movement of the carriage and its supporting table to a retracted upright position.

The tread and fabric servicer is located on the other side of the tire building drum and has means for guiding a rubberized fabric web to said drum. Said fabric web has cords which are more widely spaced than the cords of the fabric supplied by the main fabric servicer so as to adhere better to the rubber tread and sidewall portions of the tire. Novel means are provided to facilitate cutting of said fabric web, to hold the web in position, and to adjust the position of the fabric supplying means.

A tread table is mounted above the fabric web and the guiding means for said web to facilitate moving the thick rubber strip forming the tread and sidewall portions of the tire over the servicer to the tire building drum. The front portion of this tread table above the fabric supporting table is pivotally mounted to swing upwardly to a retracted position so as to permit access to said table.

An object of the present invention is to provide a tire building machine of simple inexpensive construction which reduces the cost of building pneumatic tires without reducing the quality of such tires and which requires very little space within a factory.

Another object of the invention is to provide improved means for supplying fabric to tire building machines so that less time is required to build a tire.

Other objects, uses and advantages of the invention will become apparent to those skilled in the art from the following description and claims, and from the drawings in which:

Figure 1:
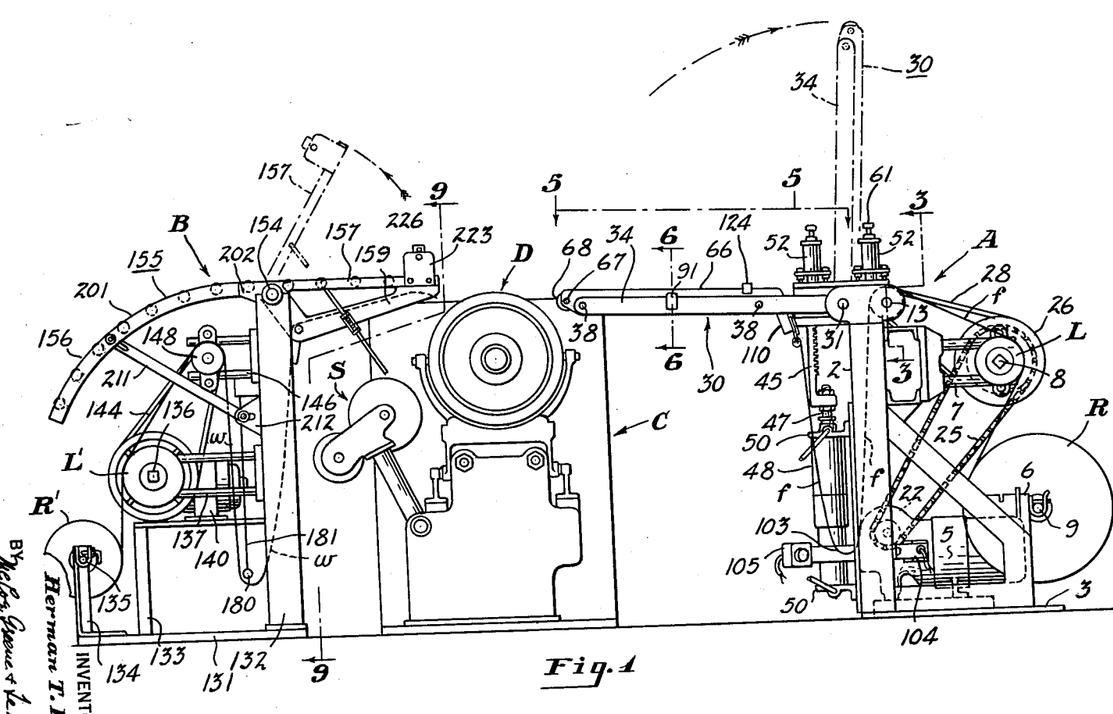
FIGURE 1 is a side elevational view on a reduced scale showing means for building a pneumatic tire, including an automatic tire building machine and two servicers constructed according to the present invention, for supplying rubberized fabric and tread and side wall material to the tire building drum, the tread and fabric supporting tables of the two servicers being shown in solid lines in their lowered positions and in dot-dash lines in their elevated positions.

Referring more particularly to the drawings, which are drawn substantially to scale and in which like parts are identified by the same numerals throughout the several views, FIG. 1 shows pneumatic tire building apparatus including a fabric servicer A, a tread and fabric servicer B, and an automatic tire building machine C of the type shown in my copending application, Serial No. 528,996, filed August 17, 1955, now U.S. Patent No. 2,838,091.

The tire building machine C comprises an expansible tire building drum D which is expanded by means of annular rubber tubes, as described in more detail in said copending application. When the drum D is fully expanded, as shown in FIG. 1, the outer metal shell of the drum has a cylindrical surface with an axis coinciding with the axis of rotation of the drum. The tire building machine C also has tread stitching means S of the type described in said copending application, for pressing the tread and side wall portions of the tire against the fabric on the tire building drum. The drum D may also be of the type shown in my application, Serial No. 193,597, now Patent No. 2,614,952.

The servicers A and B are located adjacent the tire building drum as shown in FIG. 1, so as to permit building of tires in a minimum period of time.

The servicer A has a rigid metal frame 1 with upright portions 2 and base portions 3 resting on the floor. The base portion 3 supports a two-speed constant-torque electric motor 5 and a roll support 6. An adjustable shaft support 7 is rigidly mounted on the upright portion 2 of the frame to provide an adjustable support for a wind-up shaft 8. A liner roll L is mounted on the shaft 8, and a fabric supply roll R is mounted on the let-off shaft 9 carried by the support 6. The wind-up shaft 8 is held with its axis in a predetermined horizontal position by means of two bearings 10 carried by the support 7, the roll L having a square shaft-receiving opening that fits on the square portion of the shaft 8 so that the roll rotates in unison with the shaft. A drive roll shaft 13 is rotatably mounted on the frame 1 parallel to the shafts 8 and 9, and carries a drive roll 14 having a straight-knurled outer cylindrical surface for engaging the fabric. The drive roll 14 is mounted on the shaft 13 for free rotation by the bearings 15 near the opposite ends of the roll. An annular drive collar 17 and an annular spring collar 18 are mounted on and keyed to the shaft 13, a spring 19 being provided between these collars to bias the collar 17 toward the drive roll 14. A washer 20 of uniform thickness is mounted between the vertical surfaces of the roll 14 and the collar 17 to provide a friction clutch that imparts a very light torque to the drive roll.

Figure 2:
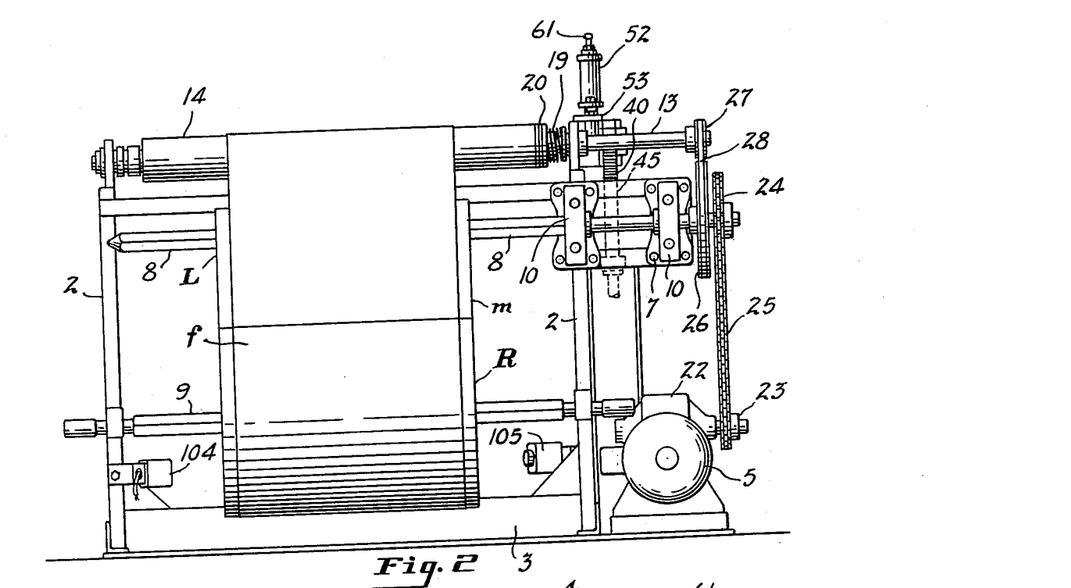
FIGURE 2 is an end elevational view on a reduced scale with parts omitted showing the servicer which supplies most of the fabric for building the tires.

The shafts 8 and 13 are driven by means including a gear box 22 that delivers power from the motor 5, at a reduced speed, to a small sprocket 23. A large sprocket 24 is rigidly mounted on the end of the shaft 8 and receives a roller chain 25 which fits on the sprocket 23. The shaft 8 is, therefore, caused to rotate at a speed less than that of the sprocket 23. A large lower pulley 26 is rigidly mounted on the shaft 8 as shown in FIG. 2, a smaller upper pulley 27 being mounted on the end of the shaft 13 in vertical alignment with the lower pulley 26. A conventional V-belt 28 fits on the pulleys 26 and 27 and transmits rotation from the shaft 8 to the shaft 13. The shaft 13, therefore, rotates at an angular speed greater than that of the shaft 8. The slip friction driving connection between the shaft 13 and the roll 14 compensates for changes in the diameter of the liner roll L with respect to the diameter of the supply roll R and permits the roll 14 to rotate at an angular speed less than that of the shaft 13.

Figure 5:
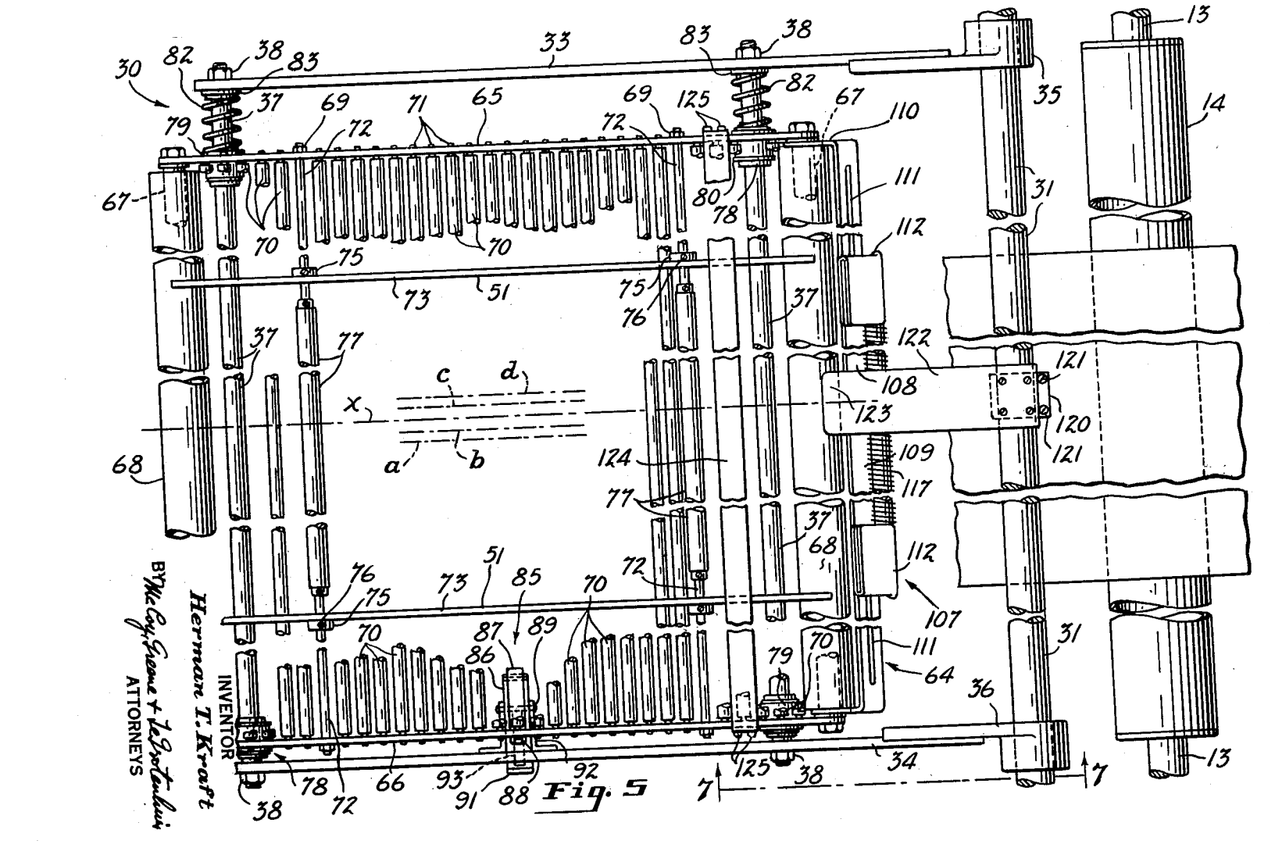
FIGURE 5 is a foreshortened top plan view with parts omitted and parts broken away taken substantially on the line indicated at 5—5 in FIG. 1, the four different positions of the center line of the fabric supporting table during building of the tire being shown in dot-dash lines.

A fabric supporting table 30 is mounted on a horizontal pivot shaft 31 parallel to the axis of the tire building drum D for vertical swinging movement about said shaft from the horizontal operating position shown in solid lines in FIG. 1 to the retracted upright position shown in dot-dash lines in FIG. 1. This table, which is best shown in FIG. 5, is of generally rectangular shape and includes parallel flat bars or arms 33 and 34, which are rigidly connected to brackets 35 and 36 by suitable bolts. The arms 33 and 34 are rigidly connected and held in parallel relation by cylindrical cross tubes 37 which are rigidly connected to said arms in positions perpendicular to the arms by nuts 38 which are screwed on the externally threaded end portions of the tubes 37. The brackets 35 and 36 are rigidly mounted on the pivot shaft 31 so that the table 30 swings about the axis of the shaft 31 in unison with said shaft when the shaft is rotated. A gear sector 40 is rigidly mounted on the shaft 31 near the end of the shaft to provide means for swinging the table. A stop member 41 is welded to the gear sector and has angularly spaced blocks 42 and 43 welded thereto to provide stops for limiting the angular swinging movement of the gear sector to about 90 degrees.

A vertically movable rack 45 is provided having teeth which mesh with the circumferential teeth of the gear sector 40, said rack being guided vertically and held in mesh with the gear sector by a rack guide 46 carried by the frame 1. The lower end of the rack 45 is rigidly connected to the upper end of the piston rod 47 of a conventional Logan Air-Draulic Cylinder by means of nuts 49. Said cylinder is rigidly held on the frame 1 by means of motor support brackets 50. The cylinder contains a conventional double-acting reciprocating piston pneumatic motor and a conventional hydraulic dash-pot connected to the motor to limit the speed of movement of the piston. This arrangement insures that the table 30 will not swing at a rate of speed dangerous to the operator of the machine.

Figure 4:
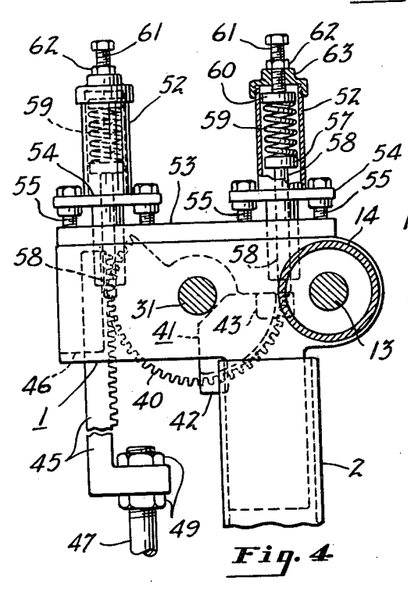
FIGURE 4 is a foreshortened vertical sectional view taken substantially on the line 4—4 of FIG. 3 and on the same scale, with parts omitted and parts broken away and shown in section.

Means are provided for stopping the swinging movement of the table 30 in either direction and for absorbing the shock due to stopping of the table. Such means is best shown in FIG. 4 and includes cylinders 52 which are rigidly mounted on the horizontal plate 53 of the frame 1 by means of cylinder flanges 54 and screws 55. A plunger is mounted on each of the cylinders 52 and has a piston-like head 57 and a rod 58 rigidly connected to said head. The rods 58 are guided vertically along vertical lines substantially tangent to the gear sector 40 so that the stops 42 and 43 engage the bottom surfaces of said rods.

Compression springs 59 are mounted on top of the heads 57 and are held in engagement with said heads by adjustable piston-like heads 60. Each head 60 is rigidly connected to a screw 61 having a locking nut 62 and extending through the central opening of the annular cap 63. Said central opening has threads which fit the threads on the screw 61 so that the position of the head 60 may be adjusted by rotating the screw 61. The nut 62 may be tightened against the cap 63 to hold the screw 61 in its adjusted position. The amount of swinging movement of the gear sector 40 may, therefore, be adjusted by means of the screw 61.

The table 30 has a transversely movable carriage 64 including parallel side rails 65 and 66 which are rigidly connected by shafts 67 located at the opposite ends of said rails in positions perpendicular to the rails. A cylindrical fabric roll 68 is mounted for rotation on each of the shafts 67 as shown in FIG. 5. A multiplicity of cylindrical roller shafts 70 having a length corresponding substantially to the distance between the side rails 65 and 66 is rotatably mounted on the side rails with the axes of said roller shafts located in a plane parallel to the top and bottom edges of the side rails and parallel to the axes of the drum D and the rolls 68. The shafts 70 are freely rotatable and are located with their upper surfaces in alignment with the upper surfaces of the rolls 68 so that the fabric f will move over the table 30 with a minimum of friction. Each of the shafts 70 has reduced end portions 71 which are mounted for rotation in the side rails 65 and 66 as indicated in FIG. 5.

A pair of spaced parallel cylindrical cross rods 72 are rigidly connected to the side rails by nuts 69 in positions parallel to the rolls 68 and 70. These cross rods provide supports for a pair of flat adjustable rails 73 having flat vertical fabric-engaging surfaces 51 and bottom surfaces which are scalloped to provide a series of regularly spaced arcuate grooves 74 (FIG. 6) to receive the rolls 70, the front and rear portions of said guides also being shaped to receive the rolls 68. The scalloped edge of each guide rail 73 reduces the distance between the guide rail and the rolls 70 so that the fabric cannot slide under the guide rails.

Figures 7, 8:
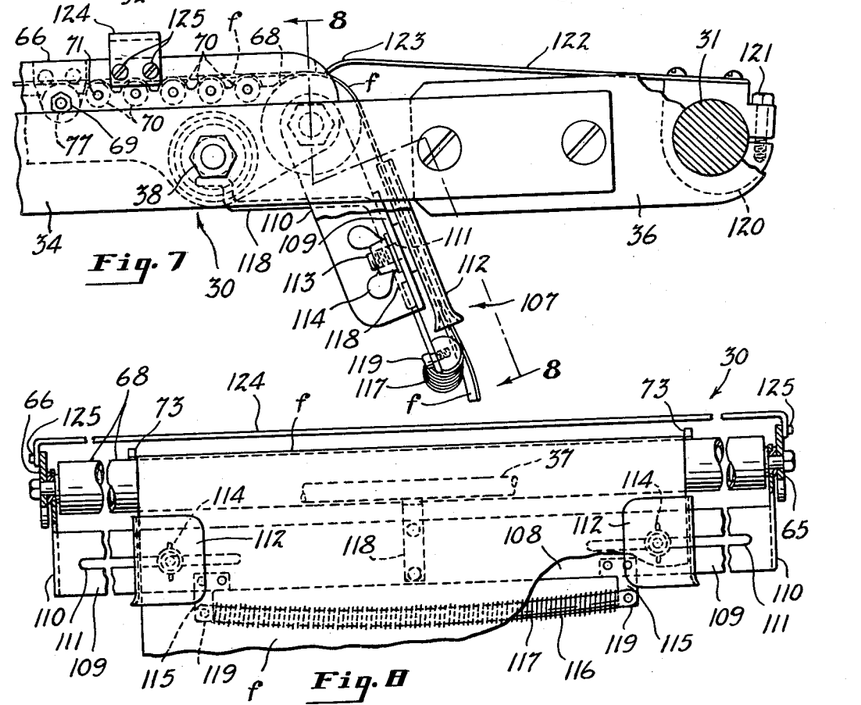
FIGURE 7 is a fragmentary side elevational view taken substantially on the line 7—7 of FIG. 5 and on a larger scale.
FIGURE 8 is a foreshortened fragmentary elevational view taken substantially on the line indicated at 8—8 in FIG. 7 and on a smaller scale.

A pair of guide-rail holding blocks 75 is rigidly mounted on each rail 73 for slidably mounting the rail on the cross rods 72. Each of the blocks 75 has an internal diameter corresponding substantially to the internal diameter of the rod 72 and may slide axially on the rod when its locking screw 76 is loosened. When the locking screws are tightened, the rail 73 is rigidly held in position on the carriage 64. The rails 73 normally are located in parallel positions the same distance from the side rails 65 and 66, as indicated in FIG. 5, so that the fabric f is located properly for application to the tire building drum. The medial vertical plane of the table 30, indicated by the dot-dash line x of FIG. 5, corresponds to the medial vertical plane of the tire building drum in which the servicer A is properly located relative to the tire building machine C. A cylindrical roll 77 is mounted for free rotation on each rod 72 and is centrally located on the rod where it cannot interfere with the normal adjustment of the guide rails 73. The upper surfaces of the rolls 77 are in alignment with the upper surfaces of the rolls 70 as indicated in FIG. 7.

Figure 6:
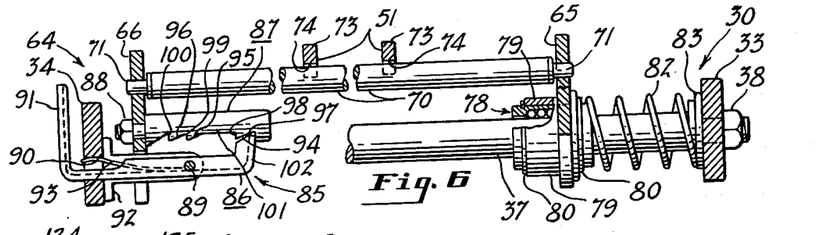
FIGURE 6 is a foreshortened fragmentary vertical sectional view with parts broken away and shown in section, taken substantially on the line 6—6 of FIG. 1 and on a larger scale.

The carriage 64 is mounted to slide axially on the cross tubes 37 as is apparent from FIGS. 5 and 6. In order to minimize the friction between the carriage and the cross tubes, it is preferable to provide roller bearings or the like whereby a very small force is required to move the carriage transversely. As herein shown, the carriage 64 is provided with four conventional Thomson ball bushings or axial bearings 78 the outer portions of which are rigidly connected to the side rails 65 and 66 by bearing retainer sleeves 79 and retaining rings 80. Each of the Thomson ball bushings may be substantially of the type disclosed in U.S. Patent No. 2,628,135.

The balls of the bearings 78 are mounted for axial rolling movement on the opposite end portions of each cross tube 37, the ball bearings engaging the cylindrical outer surface of each tube to minimize friction during movement of the carriage while at the same time preventing twisting of the carriage during axial movement thereof. The carriage is biased toward the arm 34 by a pair of compression springs 82 mounted on the tubes 37. Each spring 82 is centered at one end by the projecting end portion of the bearings 78 and at its other end by a spring collar 83, as shown in FIG. 6.

A latch assembly is provided to hold the carriage 64 in position against the action of the springs 82. The main elements of this assembly are a pawl or click 86, and a notched bar or ratchet 87. Ratchet 87 is formed by machining a round metal bar and has an end portion of reduced diameter which is threaded to receive a nut 88. Said end portion projects through a small circular opening in the side rail 66 and is rigidly held in place by the nut 88. The pawl 86 is mounted to swing on a pivot pin 89 and extends below the rail 66 and through an opening 90 in the side rail 34 so that it is accessible to the operator. The pawl is shaped to provide a handle portion 91 outwardly of the arm 34 which may be gripped by the operator to release the pawl from the ratchet. A supporting bracket or yoke 92 is rigidly mounted on the arm 34 to provide a support for the opposite ends of the pin 89. As indicated in FIG. 6, the pawl 86 is biased in a counterclockwise direction toward the bottom surface of the opening 90 by means of a flat leaf spring 93 having its end portion rigidly connected to the pawl near the pin 89. The leaf spring normally holds the pawl in one of the notches of the ratchet 87, for example as shown in FIG. 6.

As herein shown, the ratchet 87 has four notches to receive the pointed, upwardly projecting portion of the pawl 86. These notches have three spaced inclined surfaces 94, 95 and 96, four spaced vertical pawl-engaging surfaces 97 to 100, and a flat intermediate horizontal surface 101 as shown in FIG. 6 which is drawn substantially to scale. Each of the four notches is of a size to receive the pawl so that the vertical pawl-engaging surface of the notch can engage the vertical ratchet-engaging surface 102 of the pawl to prevent axial movement of the carriage 64 toward the pawl. The pawl 86 makes an audible clicking sound whenever it drops into one of the notches so as to indicate that the pawl has moved from one notch to the next adjacent notch. By counting the audible clicks the operator can easily determine the position of the carriage 64 relative to the medial plane of the tire building drum.

It will be apparent, however, that visual indicating means may be provided to indicate the distance between the members 34 and 66, or between the members 33 and 65 so that the position of the carriage 64 is more readily apparent to the eye. The audible signal as provided by the clicking of the pawl is preferred over the visual signal, however.

The fabric sheet f is wound on the supply roll R with a liner sheet m of greater width. During operation of the motor 5, the liner sheet m is pulled from the supply roll and wound up on the liner roll L. At the same time the rubberized bias-cut fabric material f is separated from the liner material and is fed by the drive roll 14 toward the tire building drum. The fabric f moves downwardly off of the roll 14 to form a large festoon between the roll 14 and the rear portion of the table 30 as indicated in FIG. 1.

A dancer roll of the type employed on the servicer B may be provided on the bottom portion 103 of the festoon in conjunction with means to control starting and stopping of the electric motor 5 in response to the vertical movement of the dancer roll so as to regulate the size of the festoon. An electric eye may be used in place of the dancer roll to offset this control.

As herein shown, a light source 104 and an electric eye 105 are mounted on the frame 1 a short distance above the floor on opposite sides of the festoon portion 103. The beam of light from the source 104 to the electric eye crosses the festoon at an angle so that the electric eye 105 can be located close to the frame 1 and out of the way of the operator. Whenever fabric is pulled from the table 30 and applied to the tire building drum, the lower portion 103 of the festoon is pulled upwardly above the light beam so that said beam strikes the electric eye. Whenever this happens, the motor 5 is automatically started to supply more fabric f to the festoon. The motor keeps running until the lower portion 103 drops back into the light beam. In this way the height of the portion 103 and the size of the festoon is effectively regulated.

It will be understood that the fabric sheet f is formed of bias-cut fabric according to conventional practice, whereby the operator may remove a section of the fabric from the table 30 of a size to fit on the tire building drum without the necessity of cutting the fabric with a knife.

A tape guide means 107 is provided for guiding the fabric strip f from the festoon to the rolls of the carriage 64, and for holding the fabric in shape as the carriage 64 is moved transversely between the arms 33 and 34. Such guide means includes a swivel bar 108 having a flat rectangular portion 109 with a length corresponding substantially to the distance between the rails 65 and 66, and vertical flange portions 110 at opposite ends of the portion 109. The upper end portions of the flanges 110 are mounted for free swinging movement on the end portions of the shafts 67 as indicated in FIGS. 5 and 8. The flat portion 109 is provided with narrow, elongated slots 111 which provide means for adjustably supporting a pair of sandwich-shaped stock guides 112. These guides have integral threaded bolt portions 113 which extend through the slots 111 to receive wing nuts 114. Each guide 112 has parallel flat portions on opposite sides of the fabric f (FIG. 7) and is rigidly mounted in an adjusted position wherein the narrow portion of the guide, connecting the flat portions of the guide, is adjacent the side edge of the fabric sheet f as indicated in FIG. 8.

A pair of L-shaped brackets 115 are rigidly mounted on the swivel bar 108 to provide a support for an arcuately curved spreader rod 116 having a radius of curvature about four to six times the length of the rod. This rod has a circular cross section and is flattened at its ends so that it may be rigidly attached to the brackets 115 by attaching bolts 119 in a position wherein the plane containing the arcuate axial center line of the rod 116 and the center of curvature of said center line is inclined at an angle of around 10° relative to the flat portion 109. A helical spring 117 is mounted on the rod 116 and extends the full length of said rod. The weight of the fabric in the festoon tends to swing the tape guide means in a clockwise direction as viewed in FIG. 7. Such movement is limited by means of an angle bar 118 having a stop portion that engages the bottom of the shaft 37 to limit the swinging movement of guide means 107.

A clamp 120 is rigidly connected to the central portion of the shaft 31 by means of a bolt 121. The clamp is rigidly connected to the end portion of a flat leaf spring 122 having a free curved end portion 123. The end portion 123 is biased toward the roll 68 and at all times presses the fabric f against the roll 68 so that the fabric will not roll off the table 30 when the table is retracted to its upright position shown in dot-dash lines in FIG. 1.

A ply holder or bar 124 is rigidly connected to the rails 65 and 66 by means of screws 125. When the fabric f is removed from the table 30 just prior to application of material from the servicer B, a small amount of fabric extends beyond the ply holder 124. This material, which extends under the ply holder, is turned back over the top of the ply holder just prior to raising of the table 30 so that the holder 124 resists pulling of the fabric downwardly off of the elevated table. This insures that the fabric f remains on the table as long as the table 30 is in its elevated position. When the table is again lowered to its horizontal operating position, the portion of the fabric turned over the holder 124 is released from the holder and is pulled forwardly to bring more material to the top of the table.

The tread and fabric servicer B is shown in FIGS. 9 to 15 and is in many ways similar to the servicer A. The servicer B has a rigid metal frame 130 with a base portion 131 that rests on the ground, and upright portions 132 which are connected to the various moving parts of the machine.

Figure 9:
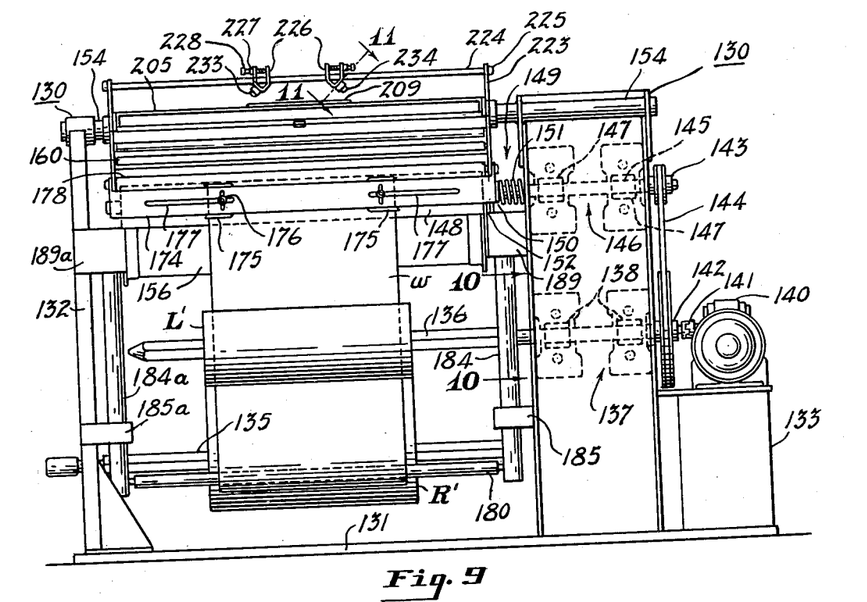
FIGURE 9 is an elevational view taken substantially on the line 9—9 of FIG. 1 and on a larger scale.

A motor support and a roll stand 134 are mounted on the base portion 131. The roll stand provides a support for a horizontal left-off shaft 135 which supports the supply roll R'. A horizontal wind-up shaft 136 similar to the shaft 8 is supported from the frame 130 by an adjustable shaft support 137 having bearings 138 which support the shaft in cantilever fashion parallel to the removable shaft 135. Means is provided for rotating the shaft 135 including a conventional gear motor 140, similar to the previously described motor 5–22, and a flexible coupling 141 as shown in FIG. 9.

A large lower pulley 142 is rigidly mounted on the driven end of the shaft 136 directly below a small upper pulley 143, a conventional V-belt 144 being mounted on the pulleys. The upper pulley is rigidly mounted on the end of a horizontal pull roll shaft 145. The latter shaft is supported by an adjustable shaft support 146 having bearings 147, which support the shaft 145 in cantilever fashion parallel to the shafts 135 and 136. An externally cylindrical aluminum pull roll 148, similar to the previously described roll 14, is mounted for free rotation on the shaft 145 by means of suitable bearings, not shown.

The external cylindrical surface of the roll 148 is preferably straight knurled so as to provide substantial friction between the fabric web w and the roll.

Figure 3:
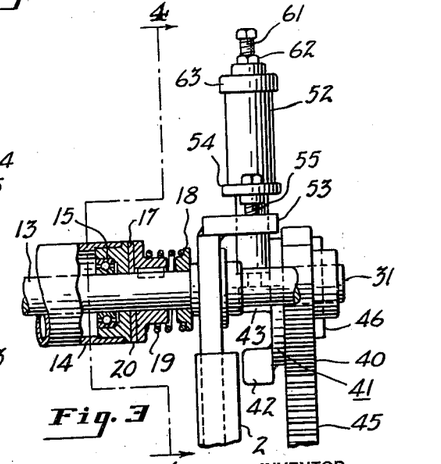
FIGURE 3 is a fragmentary vertical sectional view taken substantially along the line 3—3 of FIG. 1 and on a larger scale.

Means are provided to drive the roll 148 while permitting the roll to rotate at an angular speed less than that of the shaft 145 as the diameter of the liner roll L' increases. As herein shown, slip friction driving means 149 are provided including a slip collar 150, a helical spring 151 biasing said collar toward the roll 148, and a leather washer 152 providing a friction clutch between the collar 150 and the roll 148. The elements 150, 151, and 152 correspond substantially to the previously described elements 17, 19, and 20, shown in FIG. 3.

The rigid portion of the frame 130 includes a cylindrical non-rotatable pivot shaft 154 which is welded to the upright portions 132 of the frame near the opposite ends of the machine. This shaft provides a support for a tread table 155 having an arcuately curved portion 156 above the rolls R' and L', and a flat portion 157 projecting over the automatic tire building machine C.

Figure 13:
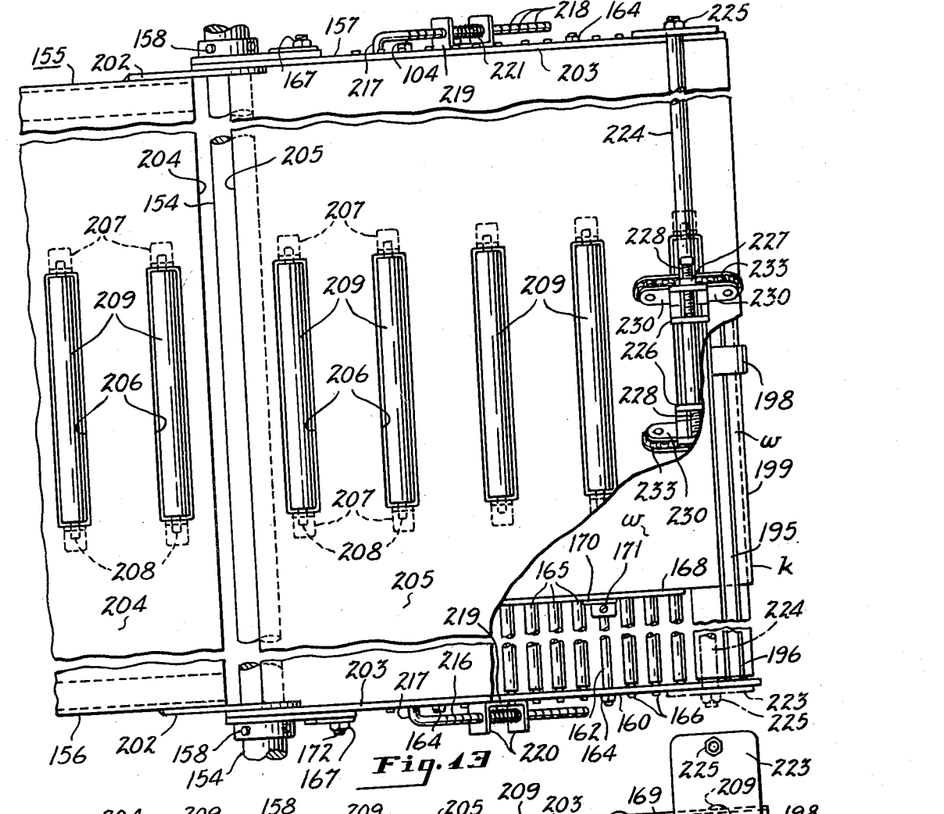
FIGURE 13 is a fragmentary top view of the tread servicer of FIG. 1 on a reduced scale with parts broken away and parts omitted.
Figures 14, 15:
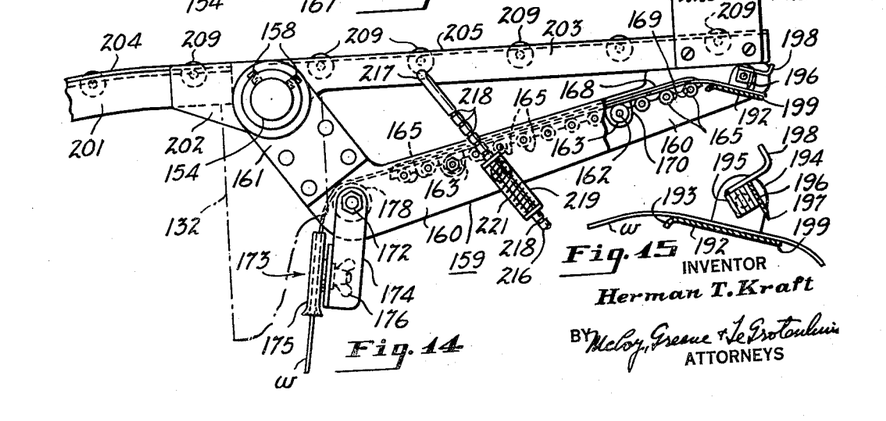
FIGURE 14 is a fragmentary side elevational view of the services of FIG. 13 on the same scale, the fabric-holding means being shown with the blade thereof in engagement with the fabric.
FIGURE 15 is a fragmentary view similar to FIG. 14 showing the fabric-holding means on a larger scale, with the blade thereof out of engagement with the fabric.

A fabric supporting table 159 is rigidly mounted on the shaft 154 in cantilever fashion to support the table portion 157. This table has a parallel pair of elongated flat side plates 160 which are bolted to or otherwise rigidly connected to a pair of side plate extensions 161. Said extensions are mounted to swing on the shaft 154 and may be rigidly held in adjusted positions on said shaft by a series of set screws 158 as indicated in FIGS. 13 and 14. The table 159 may, therefore, be adjusted to any suitable angular position relative to the shaft 154. The screws 158 grip the shaft so that the table is held rigidly in position.

The side plates 160 are held in spaced parallel relation by means of a pair of horizontal cylindrical shafts 162 having short cylindrical rolls 163 similar to the above-described rolls 77. The shafts 162 are rigidly connected to the side plates 160 by means of nuts 164 which screw on the threaded end portions of said shafts. A multiplicity of cylindrical rolls 165, similar to the rolls 70 are mounted for free rotation between the side plates 160, the reduced end portions 166 thereof being freely rotatable on said side plates.

The upper surfaces of the rolls 163 and 165 are located in the same plane as indicated in FIG. 14 so as to provide a support for the fabric web w. The web is guided midway between the side plates by means of a pair of flat guide rails 168 similar to the above-described guides 73. Each guide rail 168 has a scalloped bottom edge, including a series of arcuate grooves 169 to receive the rollers 164. Four guide-rail-holding blocks 170, similar to the blocks 75, are rigidly mounted on the guide rails 168 in alignment with the shafts 162. These blocks are slidably mounted on the shafts 162 and are held in adjusted positions by means of set screws 171 similar to the set screws 76. The guide rails 168 may, therefore, be located in any desired position on the shafts 162. The rolls 163 are located between the rails 168 in a central position so that they do not interfere with the normal adjustment of the rails 168.

Means is provided for guiding the fabric w from the pull roll 148 to the table 159 so that a festoon is formed similar to the festoon at 103. As herein shown the servicer B has tape guide means 173 similar to the previously described guide means 107. The tape guide means includes a swivel bar 174 similar to the bar 108 and a pair of sandwich-shaped stock guides 175 similar to the guides 112. The guides 175 are held in place by means of wing nuts 176 and may be slid transversely in the narrow slots 177 of the swivel bar to accommodate different widths of fabric. If desired, suitable stop means similar to the stop means 118 may be provided to limit the swinging movement of the bar 174 on the shaft 172. The guide means 173, however, may be held rigidly in position on the table 159 so that this is unnecessary. As herein shown the horizontal shaft 172 extends between the side plates 160 and is rigidly connected thereto by means of the nuts 167. Tightening of the nuts 167 holds the bar 174 in any desired adjusted position.

A large cylindrical roll 178 is rotatably mounted on the shaft 172 to guide the fabric w from the guide means 173 to the rollers 165, the outer surfaces of the roll 178 and the outer surfaces of the rolls 163 and 165 being tangent to the same plane, as indicated in FIG. 14.

Figure 10:
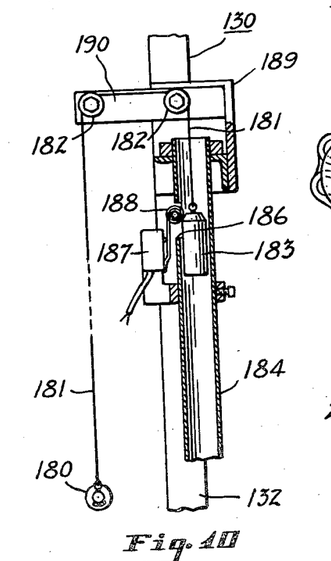
FIGURE 10 is a fragmentary vertical sectional view with parts omitted, taken substantially on the line 10—10 of FIG. 9.
Figure 11:
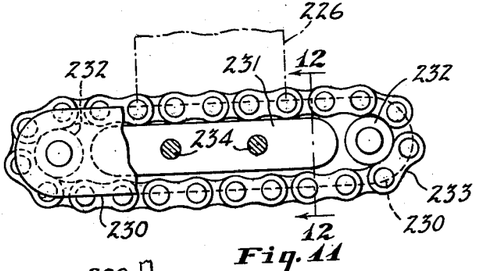
FIGURE 11 is a sectional view taken substantially on the line 11—11 of FIG. 9 and on a larger scale, with parts omitted and parts broken away.

An electric eye and a light source similar to the elements 104 and 105 may be provided to regulate the size of the festoon on the servicer B. However, as herein shown, this regulation is effected by means of a cylindrical dancer roll 180 which is connected at its opposite ends to a pair of wire ropes 181, as best shown in FIG. 10. Means are provided on each side of the machine to guide the wire ropes, including pulleys 182 and counterweights 183. A pair of vertical tubes 184 and 184a are rigidly mounted on the frame 130 by means of a pair of similar lower supports 185 and 185a and a pair of similar upper dancer-roll supports 189 and 189a. Each of the dancer-roll supports 189 and 189a has a supporting arm 190 for rotatably supporting two of the pulleys 182, as shown in FIG. 10. Each of the wire ropes 181 is connected at one end to an end portion of the dancer roll 180 and at its opposite end to one of the counter weights 183. The tube 184 is provided with a slot 186 but the tube 184a is without such a slot.

A microswitch 187 is adjustably mounted on the tube 184 to provide means for starting and stopping the operation of the electric motor at 140, the switch controlling the roller 188 of the microswitch projecting through the slot 186 into the path of movement of the counter-weight 183 so that the operation of the gear motor 140 is initiated whenever the counter-weight 183 moves downwardly out of engagement with the roller 188. It will, therefore, be apparent how the height of the dancer roll 180 is closely regulated.

Means is provided for guiding the fabric w from the table 159 toward the tire building drum D, including a flat anvil or guide 192 having a downwardly curved lip portion 193. The guide 192 is rigidly mounted between the side plates 160 by suitable means including shaft-supporting ears 194 adjacent the opposite side plates 160. The ears 194 are bolted to or otherwise rigidly connected to the side plates 160 so that the guide 192 may be rigidly mounted in any desired adjusted position. A blade support or bar 195 of square cross section is provided, which extends substantially the full distance between the side plates 160, the opposite ends of the bar 195 being journaled in the ears 194 so that the bar may be swung between the two positions indicated in FIGS. 14 and 15. A flat plate or blade 196 of uniform width having a length corresponding substantially to the distance between the side plates 160 is welded to the bar 195 with its straight pointed edge 197 parallel to the axis of rotation of the bar 195, and parallel to the flat upper surface of the guide 192. A small L-shaped handle 198 is welded to the top of the bar 195 near the center thereof as shown in FIGS. 13 and 15 so that the operator may readily swing the blade 196 into and out of engagement with the fabric on the guide 192. The front edge 199 of the guide 192 is straight and parallel to the axis of the bar 195 and the axis of the tire building drum D. This edge projects forwardly from the table 159 a sufficient distance to permit running a hot knife along said edge to cut the fabric web w.

Whenever it is desired to apply the fabric w to the carcass being built on the tire building drum, the handle 198 is swung upwardly to move the blade 196 away from the fabric to a position as shown in FIG. 15. As the handle is elevated, the end of the web w is pulled over to the tire building drum and the drum is rotated to pull more fabric from the servicer B. When enough fabric has been pulled beyond the edge 199, the handle 198 is depressed to push the blade edge 197 against the fabric. As shown in FIG. 14, the edge 197 grips the fabric to hold it firmly in position but does not cut the fabric. While the fabric is thus held in position it may be cut readily by running a hot knife along the edge 199 using such edge as a guide during the cutting.

After the fabric w is applied to the carcass being built on the tire building drum D, the tread and side wall portions of the tire are moved over the tread table 155 to the tire building drum. The rear portion 156 of the tread table has a pair of curved angles 201 welded or otherwise rigidly connected to a pair of connecting plates 202. The flat front portion 157 of the tread table has a pair of vertical side plates 203 which are pivotally mounted on the shaft 154 like the plates 202.

A thin curved metal sheet 204 is rigidly mounted on top of the angles 201 to provide a tread-supporting upper surface for the table and a smaller flat metal sheet 205 is mounted on the side plates 203 for the same purpose. The tread-supporting sheets 204 and 205 are provided with aligned regularly spaced rectangular roller-receiving slots 206, as best shown in FIG. 13. An angle bracket 207 is mounted at each end of each slot 206 to provide supports for a shaft 208. The shafts 208 are arranged in parallel spaced relation with their axes located the same distance from the plates 204 and 205 and parallel to the shaft 154. A series of cylindrical rollers 209 with a length slightly less than that of the openings 206 are mounted for free rotation on the shafts 208 to provide means for supporting the tread stock as it moves over the table 155. The rolls 209 project above the sheets 204 and 205 to minimize the friction between these sheets and the rubber strip material so that very little effort is required to move the tread and side wall portions over the tread table 155 to the tire building drum D.

It will be noted that the plates 202 of the table 155 are free to swing around the shaft 154. This swinging movement is prevented by means of an adjustable slotted angle bar 211 which is adjustably connected at one end to the table portion 156 and is adjustably connected at its opposite end to a bracket 212 carried by the frame portion 132. The angular position of the table portion 156 may, therefore, be adjusted slightly to a desired fixed position.

It will also be noted that the side plates 203 of the table portion 157 are free to swing on the shaft 154. This permits the table portion 157 to be swung upwardly from the position shown in solid lines in FIG. 1 to the elevated position shown in dot-dash lines in that figure. Means is provided for holding the table portion 157 in its elevated position including a pair of tread table support rods 216 having inwardly turned upper end portions 217, pivotally mounted on the side plates 203 and having a series of regularly spaced annular grooves 218. A pair of support rod brackets 219 are pivotally mounted on the side plates 160 at opposite sides of the table 159 to receive the rods 216, each bracket 219 having a pair of rod-receiving ears 220 with circular openings therein of a diameter substantially equal to the external diameter of the rod 216. A helical spring 221 is mounted on each rod 216 between the ears 220 of each bracket 219, whereby the grooves 218 hold the rods 216 in position to resist lowering of the table 157 when the table is elevated as shown in dot-dash lines in FIG. 1.

It is preferable to provide means on the front portion of the tread table 155 to center the tread material relative to the tire building drum D as said material is being applied to the drum. As herein shown a pair of vertical end plates 223 are rigidly mounted on the front ends of the side plates 203 to provide a support for a cylindrical tread guide shaft 224, the opposite ends of said shaft being rigidly connected to said plates by nuts 225. A pair of U-shaped clamps 226 are adjustably mounted on the shaft 224 so that they may be slid axially on the shaft to any desired position. A nut 227 is welded to the U-shaped portion of each clamp 226 to provide an internally threaded means for receiving a lock screw 228. When the lock screws 228 are tightened they spring the clamps 226 apart so that they tightly grip the shaft 224, whereby the clamps are rigidly held in position.

Figure 12:
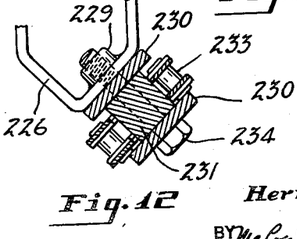
FIGURE 12 is a fragmentary sectional view taken on the line 12—12 of FIG. 11 and on the same scale.

A pair of nuts 229 are welded to the inclined portion of each clamp 226, as best shown in FIG. 12, to provide two more bolt-receiving members for that clamp. Each of the clamps 226 supports tread guiding means including a pair of flat side plates 230, a thick spacer 231, a pair of rollers 232 having intermediate cylindrical portions with a width corresponding to that of the spacer 231, and a rollerless chain 233. The plates 230, the spacer 231, and the rollers 232 are clamped in position by means of two bolts 234 which screw into the two welded nuts 229 as is apparent from FIGS. 11 and 12.

The chain 233 fits around the spacer 231 and the two rollers 232, said rollers being journaled between the plates 230 to rotate without substantial friction so that very little force is required to move the chain 233. The two chains 233 are inclined the same amount but in opposite directions as indicated in FIGS. 9 and 13 and may be positioned to engage the opposite shoulders of the tread portion of the tire so as to guide the rubber sheet forming the tread and side wall portions of the tire as said sheet is moved from the tread table 155 to the carcass built on the tire building drum D.

The operation of the machine of the present invention should be apparent from the above description. The operator normally stands on the side of the tire building drum D, adjacent the fabric-supporting table 30. Before the tire is built on the tire building drum, the table 30 is lowered to its horizontal operating position and the carriage 64 is moved toward the arm 34 until the latch 86 engages the vertical surface 97 of the ratchet bar 87 as shown in FIG. 6. At this time the medial vertical plane of the carriage 64 is in the position a shown in dot-dash lines in FIG. 5 and is spaced about one inch from the medial vertical plane of the tire building drum D indicated by the line x of FIG. 5. At this time the guide surfaces 51 are symmetrically located equally distant from the line a so as to guide the fabric with the center line of the fabric directly above the line a.

The free end of the fabric sheet f is pressed against the tire building drum D and the motor driving said drum is started to rotate the drum in one direction so as to pull the fabric from the carriage 64. The fabric in the sheet f is preferably cut to length so that one piece of fabric is applied to the drum having a length corresponding to the circumference of the drum.

As soon as the first ply is applied to the drum, the carriage 64 is pushed away from the bar 34 until one click is heard. At this time the latch 86 engages the vertical surface 98 of the rigid bar and the medial vertical plane of the carriage 64 is in the position b shown in dot-dash lines in FIG. 5, about one-half inch from the line x. The second fabric ply is then pulled from the carriage 64 while rotating the drum D in a direction opposite to said first-named direction and is applied to the drum like the first ply.

After the second ply is applied rotation of the drum D is stopped and the carriage 64 is again pushed transversely until another click of the pawl 86 is heard. At this time the latch 86 engages the vertical surface 99 of the ratchet and the medial vertical plane of the carriage 64 is in the position c on the opposite side of the line x and spaced about one-half inch from said line as indicated in FIG. 5. The third ply is then applied to the drum D while rotating said drum in said first mentioned direction.

After the third ply has been applied, the rotation of the drum D is again stopped and the carriage is moved transversely until the pawl 86 engages the last notch of the ratchet wherein the ratchet engaging surface 102 of the pawl engages the vertical surface 100 of the ratchet. At this time the medial vertical plane of the carriage 64 is in the position d and is spaced about one inch from the line x as indicated in FIG. 5. While the carriage is in this position, the fourth ply is applied to the drum D while rotating the drum in the same direction as during application of the second ply.

After these operations are completed, the end edges of the four fabric plies of the tire building carcass on the drum D are staggered. The end of the fabric sheet f projecting from the ply holder 124 toward the tire building drum is then turned back over the top of said ply holder and the pneumatic motor at 48 is actuated to elevate the rack 45. This causes rotation of the gear sector 40 and effects swinging of the table 30 from the horizontal position shown in solid lines in FIG. 1 to the vertical position shown in dot-dash lines in that figure. As the gear sector rotates the stop portion 43 moves out of engagement with one plunger rod 58 and the other stop portion 42 moves into engagement with the other plunger rod 58 to stop the upward swinging movement of the table, the spring 59 absorbing the shock caused by stopping of the table. As the table swings upwardly the swivel bar 108 swings on the end portions of the roll 68 so as to remain at generally the same inclination relative to the frame 1 while the table 30 is elevated. The ply holder 124 and the leaf spring 122 engage the fabric f to prevent the fabric from slipping off the end of the carriage 64 while the table 30 is elevated.

After the table 30 has been retracted so as to clear the aisle between the servicer A and the tire building machine C, the operator may walk through this aisle and may place the beads and may cuff the staggered end portions of the fabric projecting beyond the ends of the drum over the beads as disclosed in said U.S. Patent No. 2,838,091. The garter springs of the machine C press the staggered fabric end portions tightly against the underlying fabric so as to adhere the portions of the fabric together adjacent the beads before the tread is applied.

It will be noted that the height of the festoon measured from the portion 103 to the drive roll 14 is materially greater than the length of the carriage 64 measured between the two rolls 68. The size of this festoon is maintained substantially constant by the electric eye 105 and the associated control means. This festoon is sufficiently large to avoid twisting of the fabric and changing of the cord angle of the fabric relative to the carriage 64 which might otherwise be caused by the lateral movement of the carriage on the shafts 37.

The rubber strip forming the tread and side wall portions of the tire may be adhered directly to the fourth ply applied to the drum from the servicer A. However, it is difficult to obtain proper adhesion to the fabric f because of the close spacing of the cords. It is, therefore, preferable to employ a coarser fabric between the fourth ply and the tread. As herein shown this coarse fabric is obtained from the supply roll R'. The fabric web w has fewer cord ends per inch than the fabric f so that it will adhere better to the tread and side wall portions of the tire.

After the four plies have been applied to the drum D from the servicer A and after the fabric end portions have been cuffed over the bead rings by the stitching rings as described above, a fifth ply is applied from the servicer B. This is accomplished by adhering the free end of the fabric sheet w to the fabric drum D and rotating said drum to pull the fabric from the table 159. The rotation of the drum D is stopped at a predetermined point so that the fabric may be cut to the proper length. The handle 198 is then depressed to push the blade 196 against the anvil 192. At this time a hot knife may be moved along the edge 199 to cut the fabric to the proper length corresponding to the circumference of the fourth fabric ply. An experienced operator can easily stop the drum D at the proper time and cut the fabric to the proper length.

It will be understood that conventional carcass and tread cements may be applied during building of the tire. After the tread cement has been applied to the outside of the carcass on the drum D the strip containing the tread and side wall portions of the tire is moved over the tread table 155 to the tire building drum. The chains 233 engage the tread shoulders of the strip and guide the strip from the table 155 so that the center line of the strip is located in the medial vertical plane of the drum D indicated by the line x of FIG. 5.

After the tread is applied the stitcher S is moved against the tread and the drum D is rotated to adhere the tread and side walls to the carcass. The drum D is then contracted and the generally cylindrical tire thereon is removed axially from the end of the drum. Thereafter the tire may be formed to the conventional toric shape and vulcanized in a conventional mold. It has been found that the tire building machine disclosed herein builds tires of the highest quality, in spite of the fact that the machine is relatively inexpensive and occupies a relatively small amount of space. The machine of the present invention is, therefore, ideally suited for small factories and permits setting up automatic machinery without requiring expensive changes in previously existing facilities. The invention, therefore, permits substantial increase in the production of a small factory without a proportionate increase in the cost of material.

It is to be understood that the foregoing description is by way of illustration rather than limitation and that in accordance with the provisions of the patent statutes variations and modifications of the specific devices shown herein may be made without departing from the spirit of the invention.

Having described my invention, I claim:

1. In a tire building machine, an externally cylindrical tire building drum mounted for rotation about a horizontal axis, a servicer mounted near said drum having a frame spaced from said drum, a supply roll having a sheet of liner material and a sheet of rubberized tire fabric spirally wound thereon, means mounting said supply roll for rotation about an axis parallel to the drum axis, means for pulling said sheet from said supply roll and for separating said sheets including a pull roll and motor means for rotating said pull roll, means carried by said frame mounting said pull roll for rotation about an axis above and parallel to the axis of rotation of said supply roll, a fabric-supporting table mounted on said frame to swing about an axis parallel to the drum axis from a generally horizontal feeding position over the tire building drum to an upright retracted position spaced a substantial distance from said drum, said table having a carriage mounted for movement transversely in a direction parallel to the drum axis, a series of cylindrical fabric-engaging rolls mounted on said carriage parallel to the drum axis, means for guiding the rubberized fabric sheet from said supply roll over said pull roll to said table and for forming a fabric festoon between said rolls and said table, means for biasing the carriage in a transverse direction and for controlling the transverse movement of said carriage to locate the carriage in a series of predetermined positions, guide means for preventing relative transverse movement between said carriage and the fabric sheet supported by said carriage so that the fabric may be accurately positioned as it is applied to the tire building drum, means for producing a signal when the amount of fabric in said festoon is below a predetermined amount, and means for automatically controlling said motor means in response to said signal to maintain a supply of fabric on said table and in said festoon at all times.

2. In a tire building machine, a tire building drum mounted for rotation about a horizontal axis, a servicer comprising a fabric-supporting table mounted on a frame adjacent said drum, means for supplying a fabric sheet of uniform width to said table, means for supporting said sheet in a generally flat position comprising a carriage and a series of parallel cylindrical fabric-engaging rolls rotatably mounted on said carriage in positions transverse to the fabric sheet, means including anti-friction bearings mounting said carriage for movement on said table in a direction transverse to the fabric sheet, means for locating said carriage in a series of predetermined positions and for indicating said positions including a pawl member and a ratchet member having a series of pawl-receiving notches, one of said members being mounted on said carriage and the other member being mounted on said table and held against movement in the direction of movement of said carriage, said members holding the carriage against movement when the pawl is in any one of said notches, means for disengaging said members to permit movement of the pawl from one notch to another notch, and means for moving the pawl into each notch with sufficient force to create an audible click so that the clicking sound of the pawl indicates the position of the carriage.

3. In a tire building machine, a servicer comprising a frame, a generally rectangular fabric-supporting table mounted on the upper end portion of said frame to swing about a horizontal axis between substantially horizontal and vertical positions, motor means for moving said table between said positions, a carriage mounted on said axis, a series of for transverse movement parallel to said axis, a series of closely spaced cylindrical fabric-engaging rolls rotatably mounted on said carriage parallel to said axis, spring means biasing said carriage in one direction, releasable means for resisting movement of the carriage in said one direction and for holding the carriage in a series of predetermined selective positions on the table, and means for guiding a fabric sheet of uniform width to said carriage including a cylindrical fabric-engaging roll at the receiving end of the carriage mounted for rotation about an axis parallel to said first-named axis, a fabric supply roll and a pull roll mounted on said frame for rotation about axes parallel to said horizontal axis, means for driving said pull roll to pull the fabric from said supply roll over said pull roll, the fabric extending downwardly from said pull roll into a festoon having a normal height greater than the length of said carriage and extending upwardly from said festoon to said last-named cylindrical roll, and means for controlling operation of said pull roll in response to the position of said festoon to regulate the size of said festoon.

4. In a tire building machine, a tire building drum mounted for rotation about a horizontal axis, a servicer having a fabric-supporting table, means for feeding a sheet of rubberized tire fabric to said table, said table having a carriage mounted for movement in a direction transverse to the direction of movement of said sheet over said table, said carriage having means for supporting said sheet and for centering the sheet on the carriage while guiding the sheet over the carriage, means for holding the carriage against transverse movement, and means for guiding the sheet to the carriage as it moves upwardly from below the carriage including a generally horizontal spreader rod having a helical surface for engaging the bottom of the sheet, said rod having a length greater than the width of said sheet, the portion of the rod engaging said sheet being generally concave.

5. In a tire building machine, a tire building drum mounted for rotation about a horizontal axis, a first servicer having a rigid frame, a fabric-supporting table mounted on said frame and having a position wherein the end of the table is adjacent the upper surface of the drum, a fabric supply roll containing a rubberized fabric web and means for guilding and feeding said web from said supply roll to said table; a second servicer located on the side of said drum opposite the first servicer, said second servicer having a fabric supporting table, means for holding the table in a position wherein the end thereof is adjacent the upper surface of the drum, a supply roll conjacent the upper surface of the drum, a supply roll containing a rubberized fabric web, and means for guiding and feeding said web from said last-named supply roll to said last-named table; and means on one of said servicers for supporting a tread strip in a generally horizontal position and for guiding the same over that servicer to the tire building drum including a tread table having rollers mounted thereon generally parallel to the drum axis that engage the bottom surface of the tread strip and having means for supporting the tread table above the fabric-supporting table of that servicer with the end of the tread table adjacent the upper surface of the tire building drum.

6. In a tire building machine, a servicer comprising a frame, a generally rectangular fabric-supporting table mounted on the upper end portion of said frame to swing about a horizontal axis between substantially horizontal and vertical positions, a carriage mounted on said table for transverse movement parallel to said axis, a series of closely spaced cylindrical fabric-engaging rolls rotatably mounted on said carriage parallel to said axis, spring means biasing said carriage in one transverse direction, releasable means for resisting movement of the carriage in said one direction and for holding the carriage in a series of predetermined positions on the table, and means for guiding a fabric sheet of uniform width to said carriage including a cylindrical fabric-engaging roll at the receiving end of the carriage mounted for rotation about an axis parallel to said first-named axis, a guide member mounted on the end of the carriage to swing about the axis of said roll, said guide member having a flat surface located substantially in a plane tangent to said last-named roll for guiding the fabric to said roll, guide means on said guide member for engaging the side edges of the fabric sheet to center said sheet on the carriage, and means controlling the fabric sheet to provide a festoon extending several feet below said carriage and containing a regulated amount of fabric with a length at least twice the length of said carriage.

7. In a tire building machine having a tire building drum mounted for rotation about a fixed horizontal axis and having means for rotating said drum in opposite directions, in combination: a first servicer having a rigid frame mounted in a fixed position on one side of said drum and spaced from the drum to provide an aisle through which a person may walk, a fabric-supporting table mounted on said frame to swing about a horizontal axis from a retracted upright position at the side of the aisle remote from said drum to a generally horizontal position across said aisle wherein the discharge end of said table is adjacent the top of said drum, a carriage mounted on the table for transverse movement parallel to the drum axis and having means for supporting the web, means for biasing the carriage in a transverse direction and for controlling the transverse movement of said carriage to locate the carriage in a series of predetermined positions, means on said carriage for accurately guiding a fabric web to the tire building drum, a fabric supply roll mounted on said frame and containing a rubberized fabric web, and means for guiding and feeding said web from said supply roll to said table and over said carriage; a second servicer mounted in a fixed position on the opposite side of the tire building drum and having a fabric-supporting table with a discharge end near the top of said drum, a series of cylindrical fabric-engaging rolls mounted on said last-named table parallel to the drum axis and substantially tangent to a plane parallel to the drum axis, means on said last-named table for guiding the fabric from the table to said drum; and a tread-supply table forming the top of said second servicer and overlying all of the fabric in said servicer, said tread table having a series of cylindrical strip-engaging rolls parallel to the drum axis and tread-strip guiding means for accurately guiding material from the tread table to the tire building drum.

8. In a tire building machine having a tire building drum mounted for rotation about a fixed horizontal axis and having means for rotating said drum in opposite directions, a first servicer having a rigid frame mounted in a fixed position on one side of said drum and spaced from the drum to provide an aisle through which a person may walk, a fabric-supporting table mounted on said frame to swing about a horizontal axis from a retracted upright position at the side of the aisle remote from said drum to a generally horizontal position across said aisle wherein the discharge end of said table is adjacent the top of said drum, a carriage mounted on the table for transverse movement parallel to the drum axis and having means for supporting a fabric web, means for biasing the carriage in a transverse direction and for controlling the transverse movement of said carriage to locate the carriage in a series of fixed selective positions, means on said carriage for accurately guiding the fabric web to the tire building drum, a fabric supply roll mounted on said frame and containing a rubberized fabric web, and means for guiding and feeding said web from said supply roll to said table and over said carriage, motor means for swinging said first-named table between its horizontal and its upright position including a gear segment rigidly connected to said table to swing about the pivotal axis of said table, a rack having teeth meshing with the teeth of said gear segment, a double-acting reciprocating-piston pneumatic motor having a piston rod connected to said rack to reciprocate the same, and means for limiting swinging movement of the table and for cushioning the shock when the table is decelerated including a pair of stop members rigidly connected to said gear segment and yieldable means for engaging the stop members as the table arrives at said horizontal and said upright positions; and a second servicer mounted in a fixed position on the opposite side of the tire building drum and having a fabric-supporting table with a discharge end near the top of said drum, and a tread-supply table forming the top of said second servicer and overlying all of the fabric in said second servicer.

9. In a tire building machine, a servicer comprising a frame, a generally rectangular fabric-supporting table mounted on the upper end portion of said frame to swing about a horizontal axis between substantially horizontal and vertical positions, motor means for moving said table between said positions, a carriage mounted on said table for transverse movement parallel to said axis, a series of closely spaced cylindrical fabric-engaging rolls rotatably mounted on said carriage parallel to said axis, spring means biasing said carriage in one direction, releasable means for resisting movement of the carriage in said one direction and for holding the carriage in a series of separate fixed selective positions on the table, and means for guiding a fabric sheet of uniform width to said carriage including a cylindrical fabric-engaging roll at the receiving end of the carriage mounted for rotation about an axis parallel to said first-named axis, a swivel bar mounted on said carriage to swing about an axis parallel to said first-named axis, a pair of fabric guides mounted on said swivel bar extending around the opposite side edge portions of the fabric sheet to guide the sheet onto the fabric supporting table, a curved spreader rod rigidly mounted on said swivel bar below said fabric guides and generally parallel to said first-named axis, said rod extending between said fabric guides and having a downwardly bowed central portion, and means carried by said rod providing a helical surface for engaging the bottom of the fabric sheet as it passes through said fabric guides to the fabric-supporting table, a fabric supply roll and a pull roll mounted on said frame for rotation about axes parallel to said first-named axis, means for driving said pull roll to pull the fabric sheet from said supply roll over said pull roll, the fabric extending downwardly from said pull roll into a festoon having a normal height greater than the length of said carriage and extending upwardly from said festoon to said last-named cylindrical roll, and means responsive to the height of said festoon for controlling operation of said pull roll to regulate the size of said festoon.

10. In a tire building machine, an externally cylindrical tire building drum mounted for rotation about a horizontal axis, a servicer mounted near said drum having a frame spaced from said drum, a supply roll having a sheet of liner material and a sheet of rubberized tire fabric spirally wound thereon, means mounting said supply roll for rotation about an axis parallel to the drum axis, means for pulling said sheets from said supply roll and then separating said sheets including a pull roll and motor means for rotating said pull roll, means carried by said frame mounting said pull roll for rotation about an axis above and parallel to the axis of rotation of said supply roll, a fabric-supporting table mounted on said frame to swing about an axis parallel to the drum axis from a generally horizontal feeding position over the tire building drum to an upright retracted position spaced a substantial distance from said drum, said table having a carriage mounted for movement transversely in a direction parallel to the drum axis, a series of cylindrical fabric-engaging rolls mounted on said carriage parallel to the drum axis, means guiding the rubberized fabric sheet from said supply roll over said pull roll to said table and forming a fabric festoon between said rolls and said table, means biasing said carriage in one transverse direction, releasable means resisting movement of the carriage in said one direction and holding the carriage in a series of fixed selective positions on the table, said spring means yieldably holding the carriage in each of said positions when the carriage is moved to that position, guide means carried by said carriage for preventing relative transverse movement between said carriage and the fabric sheet supported by said carriage so that the fabric is accurately positioned as it is moved from the carriage to the tire building drum, means for guiding the fabric sheet to said carriage including a cylindrical fabric engaging roll at the receiving end of the carriage mounted for rotation about an axis parallel to the drum axis, a guide member mounted on the end of the carriage to swing about an axis parallel to the drum axis, said guide member having a surface located generally in a plane tangent to said last-named roll for guiding the fabric to said roll, said guide member having means for engaging the side edges of the fabric sheet to center said sheet on the carriage, and means responsive to the position of said festoon for automatically controlling said motor means to maintain a regulated amount of fabric in said festoon having a length at least twice the length of said carriage.

References Cited in the file of this patent

UNITED STATES PATENTS

| | | |
|---|---|---|
| 1,738,503 | Stevens | Dec. 3, 1929 |
| 2,343,954 | Carlin | Mar. 14, 1944 |
| 2,346,439 | Leguillon | Apr. 11, 1944 |
| 2,394,464 | McChesney | Feb. 5, 1946 |
| 2,418,783 | McChesney | Apr. 8, 1947 |
| 2,480,704 | Breth | Aug. 30, 1949 |
| 2,558,903 | Kastner | July 3, 1951 |
| 2,588,207 | Cleland et al. | Mar. 4, 1952 |
| 2,655,321 | Sternad et al. | Oct. 13, 1953 |
| 2,671,495 | Iredell et al. | Mar. 9, 1954 |